United States Patent
Roberts et al.

(10) Patent No.: US 9,162,388 B2
(45) Date of Patent: Oct. 20, 2015

(54) EXTRUDER

(71) Applicant: Thermo Electron (Karlsruhe) GmbH, Karlsruhe (DE)

(72) Inventors: Peter Roberts, Stone Staffordshire (GB); Ralf Weber, Karlsruhe (DE)

(73) Assignee: Thermo Electron (Karlsruhe) GMBH, Karlsruhe (DE)

( * ) Notice: Subject to any disclaimer, the term of this patent is extended or adjusted under 35 U.S.C. 154(b) by 0 days.

(21) Appl. No.: 14/346,933

(22) PCT Filed: Sep. 21, 2012

(86) PCT No.: PCT/EP2012/003948
§ 371 (c)(1),
(2) Date: Mar. 24, 2014

(87) PCT Pub. No.: WO2013/045058
PCT Pub. Date: Apr. 4, 2013

(65) Prior Publication Data
US 2014/0234460 A1    Aug. 21, 2014

(30) Foreign Application Priority Data
Sep. 30, 2011 (DE) .................... 10 2011 114 576

(51) Int. Cl.
B29C 45/78 (2006.01)
B29C 47/80 (2006.01)
B29C 47/08 (2006.01)
B29C 47/00 (2006.01)
B29C 47/92 (2006.01)

(52) U.S. Cl.
CPC ......... *B29C 47/0864* (2013.01); *B29C 47/0002* (2013.01); *B29C 47/0009* (2013.01); *B29C 47/0827* (2013.01); *B29C 47/92* (2013.01)

(58) Field of Classification Search
CPC  B29C 47/92; B29C 47/0864; B29C 47/0827; B29C 47/788; B29C 47/0808; B29C 2947/92704
See application file for complete search history.

(56) References Cited

U.S. PATENT DOCUMENTS

| 3,369,594 A | | 2/1968 | Farrell |
| 3,645,659 A | * | 2/1972 | Schott, Jr. .................... 425/204 |
| 3,750,905 A | * | 8/1973 | Wolfrom ......................... 222/23 |
| 4,102,958 A | | 7/1978 | Wertz |
| 5,202,815 A | * | 4/1993 | Le Boennec et al. ......... 361/695 |
| 6,041,850 A | * | 3/2000 | Esser et al. ............... 165/104.33 |

(Continued)

FOREIGN PATENT DOCUMENTS

| CN | 1765612 | 5/2006 |
| DE | 202005003920 U1 | 6/2005 |

(Continued)

*Primary Examiner* — Yogendra Gupta
*Assistant Examiner* — Emmanuel S Luk
(74) *Attorney, Agent, or Firm* — William R. McCarthy, III

(57) ABSTRACT

The invention relates to an extruder which has an extruder housing, in which a delivery channel for a medium to be extruded is formed. At least one screw conveyor is located in the delivery channel and a cooling device is provided for the extruder housing, said device having at least one cooling line in or on the extruder housing, through which line a cooling fluid flows. An electronic device for controlling and/or regulating the operating states of the extruder is accommodated in an electronics housing which can be cooled according to the invention by means of the cooling device for the extruder housing.

7 Claims, 2 Drawing Sheets

(56) References Cited

U.S. PATENT DOCUMENTS

Figure 1:
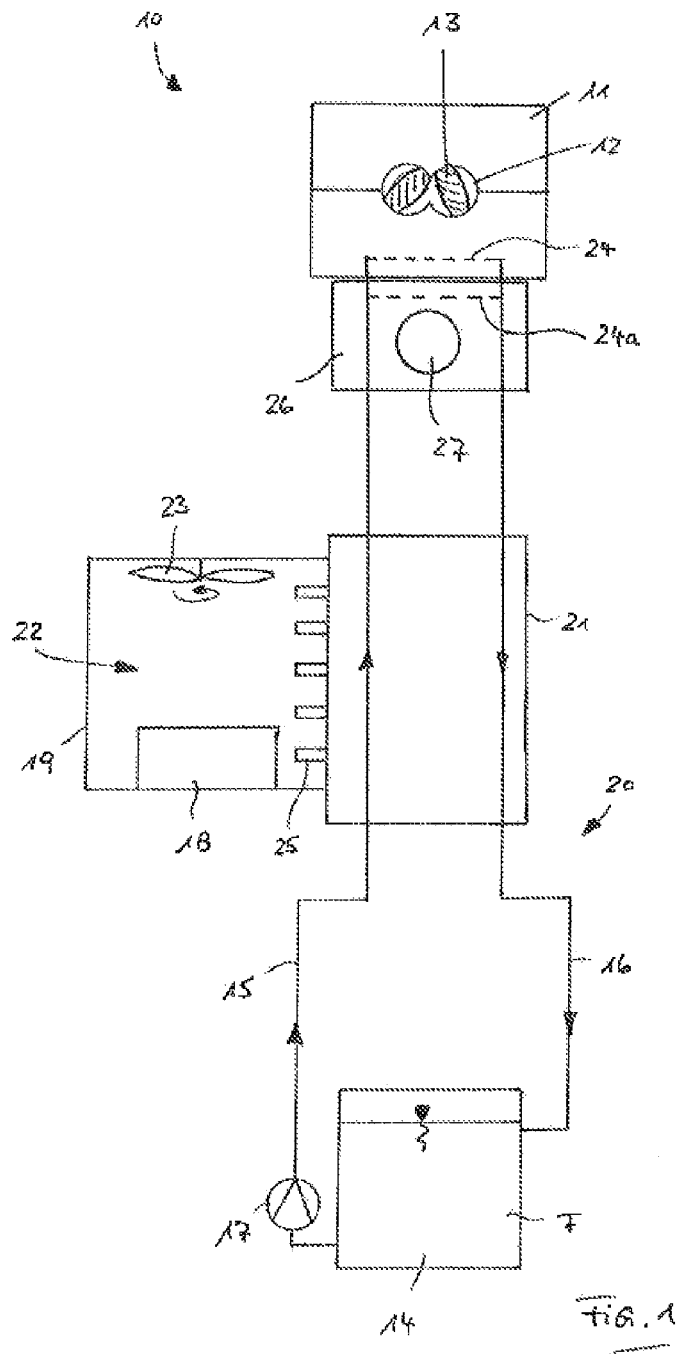

| | | |
|---|---|---|
| 6,495,804 B2 | 12/2002 | Zahradnik |
| 7,374,067 B2 | 5/2008 | De Miceli |
| 7,760,496 B2 * | 7/2010 | Tsukazawa ............... 361/679.48 |
| 2009/0218072 A1 * | 9/2009 | Eriksen ..................... 165/80.2 |
| 2010/0290190 A1 * | 11/2010 | Chester et al. ................ 361/701 |
| 2011/0221088 A1 | 9/2011 | Fuse |

FOREIGN PATENT DOCUMENTS

| | | |
|---|---|---|
| EP | 0021278 B1 | 5/1985 |
| EP | 1132192 B1 | 7/2005 |
| EP | 1637234 A1 | 6/2012 |

* cited by examiner

EXTRUDER

The invention relates to an extruder comprising an extruder housing, in which is configured a feed channel for a medium to be extruded, which feed channel has at least one screw conveyor arranged therein, comprising a cooling device for the extruder housing, which cooling device has at least one cooling line, configured in or on the extruder housing and is flowed through by a cooling fluid, and comprising an electronics device, accommodated in an electronics housing, for controlling and/or regulating the operating states of the extruder.

An extruder is a conveying device which by means of a screw conveyor presses a solid, liquid or powdery medium, in particular under pressure and at high temperature, out of a shaping opening. In this context, a distinction can be drawn between processing extruders and compounding extruders. A processing extruder is used substantially for shaping, while a compounding extruder is used for chemical and/or physical modification, for example for the mixing, degasification or investigation of substances. According to the invention, both types of extruders should be jointly included.

An extruder possesses an extruder housing, in which a mixing or feed channel for the medium to be conveyed and extruded is configured. In the feed channel is disposed, in a tight fit, at least one screw conveyor, which is rotationally driven, whereby the medium is transported along the feed channel. An extruder can comprise one, two or even more screw conveyors, which are usually arranged in parallel and, depending on the nature of the medium and of the conveyance, are driven either in the same direction or in opposite directions.

During operation, the extruder housing must be regulated and cooled and/or heated with respect to its temperature. For the cooling, a cooling device is provided for the extruder housing, which cooling device cools the extruder housing at least in sections and, in particular, in a plurality of separately controllable sections. By the term "cooling" is understood the lowering of the temperature by at least a small temperature difference.

A known cooling device comprises a tank, in which a cooling fluid, usually a cooling liquid, is accommodated, which cooling fluid is kept in a known manner at a predefined temperature. From the tank, a supply line leads to the extruder housing, in which at least one cooling line is configured. From the extruder housing, a return line leads back to the tank, wherein the cooling fluid can be conveyed by means of a pump in a cooling circuit comprising the tank, the supply line, the cooling line and the return line.

In order to be able to control and/or regulate the individual operating states of the extruder in the desired manner, an electronics device, accommodated in an electronics housing, is provided. The electronics device can overheat during lengthy operation, for which reason it is known likewise to cool the electronics device. For this purpose, a fan is provided, which fan blows against the electronic components and thus subjects them to ambient air, whereby heat is evacuated. Alternatively or additionally thereto, cooling ribs of standard construction can be provided on the electronics housing. The effect of the cooling ribs is that the electronics housing possesses a large surface and thus more easily gives off excess heat. Although such cooling of the electronics device is in many cases sufficient, it has the associated problem that it is critical from a hygiene point of view, which, particularly if the extruder is used in rooms in which heightened hygiene requirements exist, for example in the pharmaceutical industry, can lead to problems. By means of the fan for cooling the electronics device, pollutants are distributed over a wide area in the environment, which is unhygienic. Over the course of time, pollutants are deposited in the cooling ribs or similar air shafts, which pollutants can lead to contamination and have to be laboriously removed.

The object of the invention is to provide an extruder of the stated type, which satisfies the heightened hygiene requirements.

This object is achieved according to the invention by an extruder having the features of claim 1. It is here provided that the electronics housing can be cooled by means of the cooling device which serves to cool the extruder housing.

According to the invention, the basic rationale is to execute the cooling of the electronics housing, and thus of the electronics device, likewise with that cooling device which is provided for the cooling of the extruder housing. In this way, it is possible to dispense with fans which subject the electronics device to an air stream of ambient air, as well as with outer cooling ribs, so that the risk of states of the extruder which are critical from a hygiene point of view is avoided.

In a refinement of the invention, it can be provided that the cooling device has a store for the cooling fluid, a supply line leading from the store to the cooling line, a return line leading from the cooling line to the store, and a pump. Alternatively, it is also possible, however, not to return the cooling fluid from the cooling line to the store, but rather to drain it off, i.e. release it or discharge it to the environment, so that no cooling fluid circuit, but rather a cooling fluid passage is obtained.

In one possible embodiment of the invention, it is provided that the supply line and/or the return line run through a component which forms at least one section of the electronics housing or is in direct contact with the electronics housing. Since the supply line and/or the return line run through the component, the component too is cooled in relation to the ambient temperature. If the component forms a section of the electronics housing, the result is that also the electronics housing is cooled.

Alternatively, it is possible to connect the electronics housing thermally to the component, whereby the cooled component has an influence on the temperature of the electronics housing and cools the latter. It has been shown that it is thereby possible to keep the electronics housing, and thus also the electronics device, within the region of a desired operating temperature for a long period. It is here possible for the extruder to be arranged with the electronics housing in a different room than the store for the cooling fluid and/or the pump, which is desirable, particularly in applications within pharmaceutical production, for example in clean rooms.

As the cooling fluid, a cooling liquid, for example water, or a gas, in particular air, can be used.

The supply of the cooling fluid to the extruder housing or to the component, and the evacuation of the cooling fluid, can be realized in a common cooling circuit. It is also possible, however, to provide for this purpose two cooling circuits connected in series, wherein the heat or cold transfer between the two cooling circuits is realized by means of a heat exchanger.

In order to improve the heat transfer between the cooled component and the interior, accommodating the electronics device, of the electronics housing, in a refinement of the invention it can be provided that the component has projections and, in particular, cooling ribs, which project into the interior of the electronics housing. These projections or cooling ribs cannot get dirty, since they are disposed in the interior of the electronics housing, which interior is preferably fully encapsulated from the environment.

The extruder housing can be detachably fastened on a stand part or a bearing part, so that it can be exchanged. In a preferred embodiment of the invention, it is provided that the cooled component is a bearing part supporting the extruder housing.

In a refinement of the invention, it can be provided that the interior, accommodating the electronics device, of the electronics housing is as far as possible sealed off and, in particular, fully encapsulated from the environment. In this way, a situation in which pollutants can enter the electronics housing is reliably avoided. In addition, it is possible to wash down the electronics housing, for cleaning purposes, with a cleaning liquid, without risk of damage to the electronics.

In the electronics housing, a fan can be arranged. This serves solely to circulate the air within the electronics housing, without the occurrence of an air exchange with the surrounding atmosphere.

Figure 2:
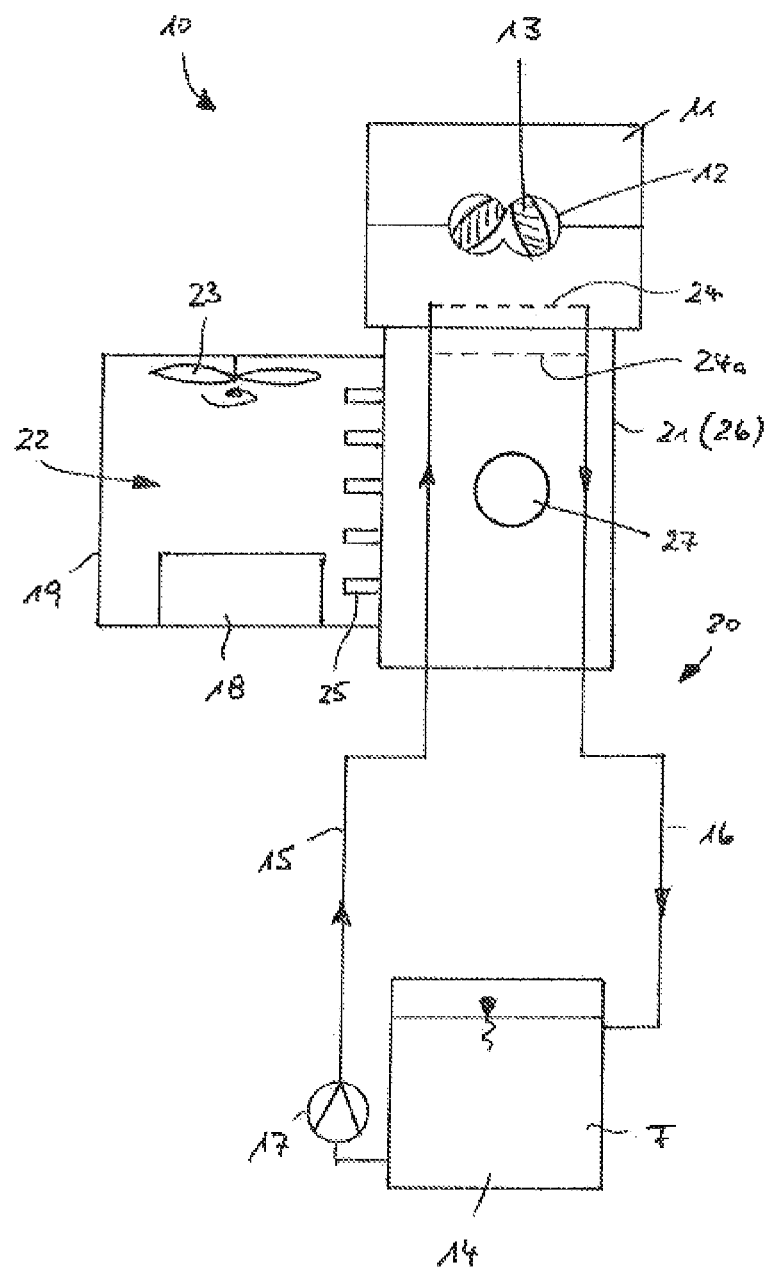

Further details and features of the invention can be seen from the following description of illustrative embodiments with reference to the drawing, wherein:

FIG. 1 shows a schematic representation of an extruder having a cooling device according to a first illustrative embodiment, and FIG. 2 shows a schematic representation of an extruder having a cooling device according to a second illustrative embodiment.

In FIG. 1, an extruder 10 possessing an extruder housing 11 in which a feed channel 12 is configured is represented only schematically. In the feed channel 12 are arranged two screw conveyors 13 extending perpendicular to the plane of the drawing. The extruder housing 11 is mounted on a bearing part 26 and is detachably fastened thereon (in a non-represented manner). In the bearing part 21 is arranged an electrical heating device 27 (represented only schematically), with which the extruder housing 11 can be heated.

Independent from the bearing part 26 and preferably at a distance therefrom is arranged a further component 21, which can be, for example, a further bearing block.

A cooling device 20 for the extruder housing 11 comprises a store 14, for example a tank, for a cooling fluid F, from which a supply line 15 runs through the component 21 and through the bearing part 26 into the extruder housing 11, passes there into a cooling line 24 connected to by a return line 16, which likewise runs through the bearing part 26 and through the component 21 and emerges again in the store 14. Alternatively or additionally thereto, a cooling line 24a, which is flowed through by the cooling fluid, can be configured in the bearing part 26, directly beneath the extruder housing 11. In the supply line 15 is arranged a pump, by means of which the cooling fluid F can be conveyed in the supply line 15 to the extruder 11, through the there situated cooling line 24 or 24a, and in the return line 16 back to the store 14. By means of the cooling device 20, it is possible to set and influence the temperature of the extruder housing 11 in the desired manner.

An electronics device 18, which controls or regulates the operating states of the extruder 11, is accommodated in an interior 22 of an electronics housing 19 which is encapsulated from the surrounding atmosphere. In the represented illustrative embodiment, the component 21, which is penetrated by the supply line 15 and the return line 16, forms a wall of the electronics housing 19 and possesses projections in the form of cooling ribs 25, which project into the interior 22 of the electronics housing. Within the interior 22 is provided a rotationally driven fan 23, by means of which the air can be circulated in the interior 22 of the electronics housing 19, though an air exchange with the surrounding atmosphere is preferably completely avoided.

When the extruder housing 11 is cooled, the cooling fluid F flows through the supply line 15 and through the return line 16. In this way, the component 21 and the bearing part 26 are also cooled. Since the component 21 is a part of the electronics housing 19, this too is cooled in the desired manner, wherein the heat exchange to the interior 22 of the electronics housing 19 via the cooling ribs 25 is improved.

FIG. 2 shows an alternative embodiment of the extruder, wherein the extruder 11 and its cooling device 20 have basically the same construction as in the illustrative embodiment according to FIG. 1. In the illustrative embodiment according to FIG. 2, the component 21, to which the electronics housing 19 is connected, at the same time also forms the bearing part 26, on which the extruder 11 is supported, i.e. the component 21 and the bearing part 26 are combined and formed only by a single part.

Here too, the electronics housing 19 is preferably fully encapsulated from the environment and has a fan 23 in the interior 22.

The invention claimed is:

1. An extruder comprising
   an extruder housing, comprising a feed channel configured to extrude a medium, wherein the feed channel has a screw conveyor arranged therein;
   a cooling device comprising a cooling circuit that includes a store for the cooling liquid, a supply line, a return line and a cooling line wherein the cooling line is disposed in or on the extruder housing and configured to flow the cooling liquid therein to exchange heat with the extruder housing; and
   an electronics device, accommodated in an interior space of an electronics housing, configured to control and/or regulate the operating states of the extruder, wherein the interior space of the electronics housing is cooled by a component thermically coupled to the interior space that comprises the supply line and/or the return line configured to flow the cooling fluid to and from the cooling device to exchange heat with the component.

2. The extruder as claimed in claim 1, wherein the cooling circuit comprises the supply line leading from the store to the cooling line, the return line leading from the cooling line to the store, and a pump.

3. The extruder as claimed in claim 1, wherein the component forms at least one section of the electronics housing or is in direct contact with the electronics housing.

4. The extruder as claimed in claim 3, wherein the component has projections or cooling ribs, which project into the interior space of the electronics housing.

5. The extruder as claimed in claim 3, wherein the component is a bearing part supporting the extruder housing.

6. The extruder as claimed in claim 1, wherein the interior space of the electronics housing is as far as possible sealed off and fully encapsulated from the environment.

7. The extruder as claimed in claim 1, wherein a fan is arranged in the interior space of the electronics housing.

* * * * *